United States Patent [19]

Wilhelmson

[11] Patent Number: 4,501,665

[45] Date of Patent: Feb. 26, 1985

[54] SELF-CONTAINED SEWAGE TREATMENT SYSTEM AND METHOD

[76] Inventor: Thomas J. Wilhelmson, P.O. Box 2243, Redding, Calif. 96099

[21] Appl. No.: 621,191

[22] Filed: Jun. 15, 1984

[51] Int. Cl.[3] .............................................. C02F 3/30
[52] U.S. Cl. .................................... 210/630; 210/136; 210/151; 210/170; 210/532.2
[58] Field of Search ............... 210/609, 630, 136, 170, 210/162, 307, 532.2, 150, 151, 806

[56] References Cited

U.S. PATENT DOCUMENTS

| | | | |
|---|---|---|---|
| 2,834,471 | 5/1958 | Gibson | 210/532.2 X |
| 3,306,447 | 2/1967 | Medeiros | 210/170 X |
| 3,770,623 | 11/1973 | Seidel | 210/170 X |
| 3,794,176 | 2/1974 | Schnyder | 210/532.2 X |
| 4,100,073 | 7/1978 | Hopcroft | 210/532.2 |
| 4,251,359 | 2/1981 | Colwell et al. | 210/630 X |
| 4,293,421 | 10/1981 | Green | 210/532.2 X |
| 4,439,323 | 3/1984 | Ball | 210/532.2 X |

*Primary Examiner*—Thomas Wyse
*Attorney, Agent, or Firm*—Joseph L. Strabala

[57] ABSTRACT

A self-contained sewage treatment system and method includes a first waterless treating tank operable to separate feculent solids from raw sewage influent in a suspended bio-mass for effective aerobic bacterial digestion in this tank with the outlet of the waterless tank connected to the inlet of a septic tank where sedimentation of the smaller entrained organic particles in the liquor leaving the waterless tank can occur and undergo anaerobic bacterial digestion. The system can include pipe means for distributing the clear liquor from the septic tank in a leach field where it can be disposed of in a safe, pollution-free and environmentally acceptable manner without deleterious effects. Because the method of treatment effectively removes all of the organic solids from the raw sewage influent by using aerobic digestion followed by anaerobic digestion in sequential steps, the clear liquor leaving the septic tank will be environmentally safe and free of all entrained organic matter.

13 Claims, 3 Drawing Figures

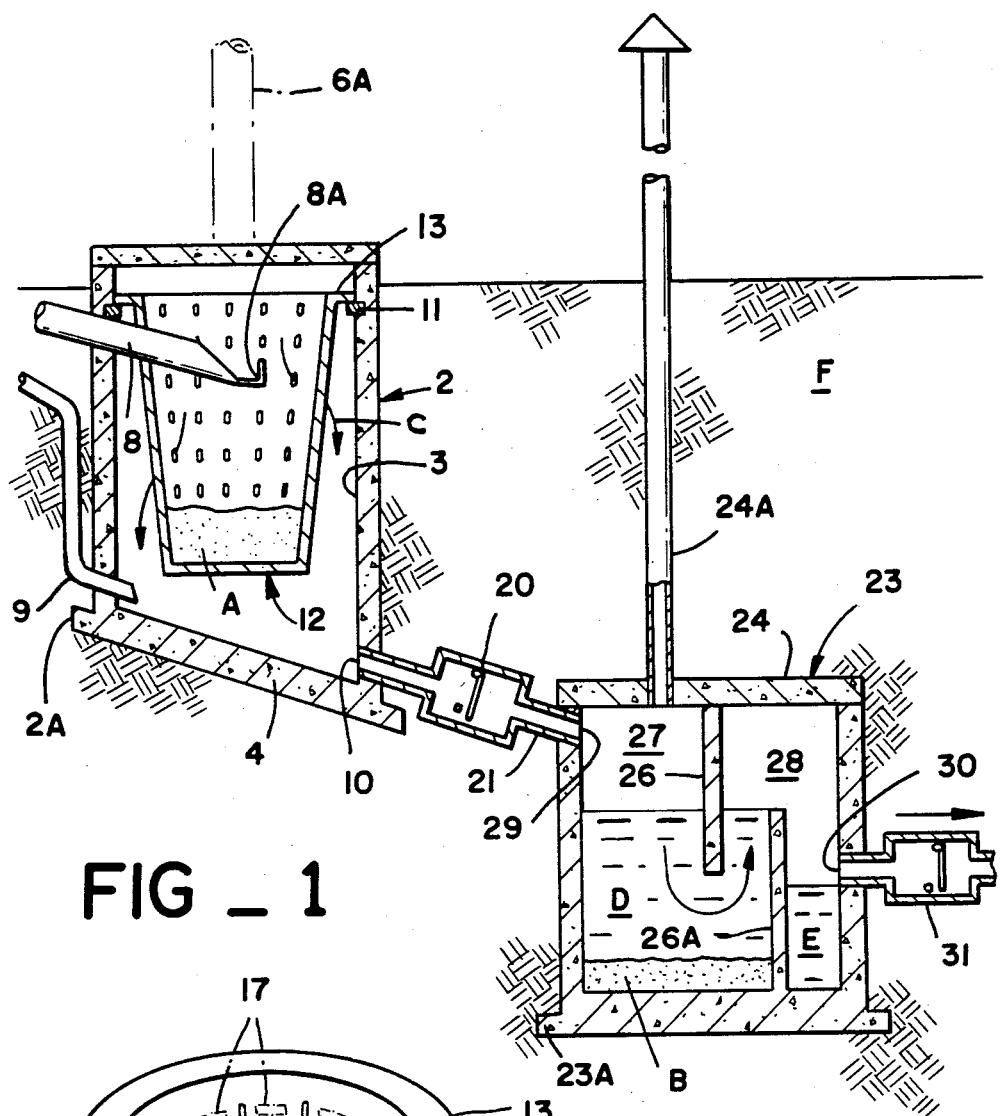
FIG _ 1
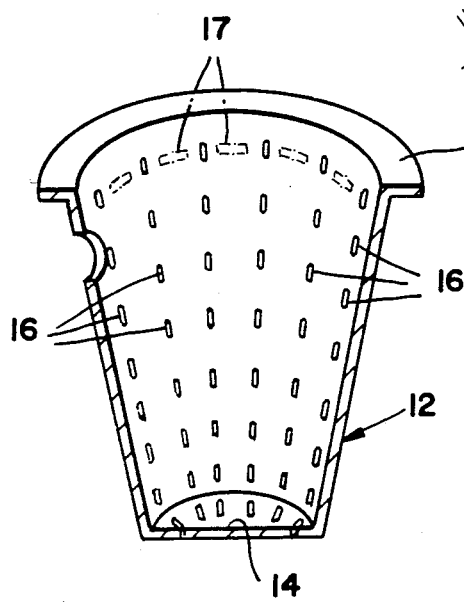
FIG _ 2

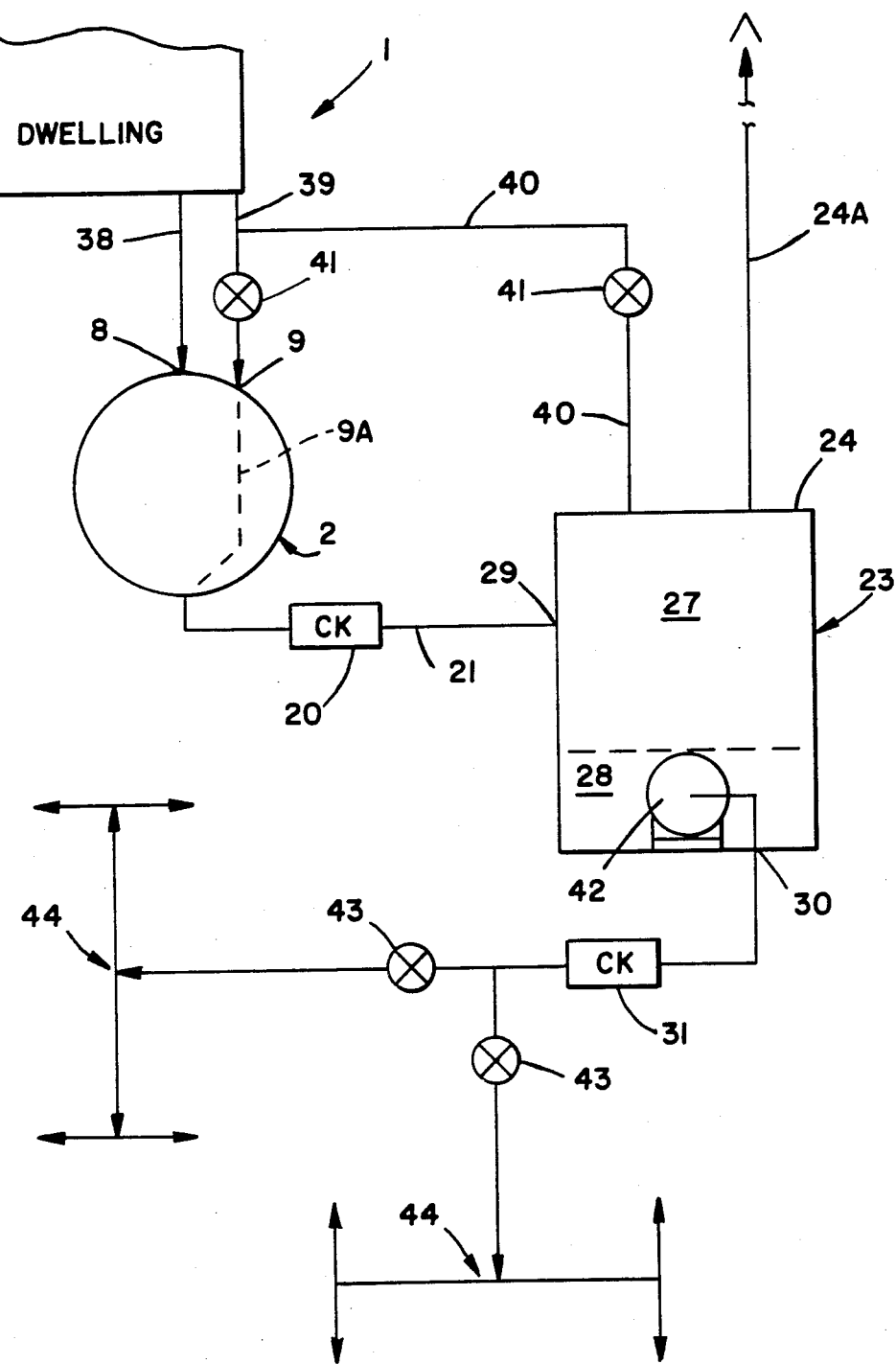
FIG_3

SELF-CONTAINED SEWAGE TREATMENT SYSTEM AND METHOD

BACKGROUND

Treatment of raw sewage in any locality is and remains a problem. It is well known that raw sewage can spread typhoid fever, dysentery and cholera. It also can contaminate large bodies of water into which the untreated sewage is discharged. Further, as raw sewage decomposition occurs in a large body of water, it depletes the oxygen normally present in the water which can result in the destruction of all marine life due to the depletion of the life sustaining oxygen.

Thus, the treatment of raw sewage is typically designed to remove or alter the objectionable suspended and semi-solid or solid materials in the raw sewage so that the resulting liquor may be safely disposed in a large body of water or leached into the soil without the destructive side effects.

Typical commercial raw sewage treatment systems are known as "water carriage systems" which include sewer mains (pipes) which carry the raw sewage to a common site for treatment. The semi-solid or solid materials in the raw sewage in these systems represents approximately 0.2% by volume with 99.8% of the effluents composed of water. Obviously in such conventional sewage systems, the high water content poses a significant problems in treatment due to its large volume, especially when a considerable amount of volunteer water enters the sewage piping or carry system. Many building codes restrict the connection of downspouts and the like to commerical sewage carry systems due to the difficulty in treating the large volume of raw sewage resulting when augmented by rain water from storm drains and the like.

In rural areas where water carriage sewage systems are unavailable, raw sewage disposal has been typically handled either by cesspools or septic tanks. Prolonged use of cesspools can often result in the saturation of the surrounding soil, which in time can cause very unsanitary conditions. Further, soil formations which are stratified often have cracks through which polluted effluent from said cesspools may travel great distances without dilution or natural filtration, thereby causing contamination of ground water and/or wells furnishing drinking water.

Currently dwellings in rural areas, by building codes, are required to have septic tanks which are presumably watertight and which permit the settling of sewage solids in a large chamber so bacterial decomposition of these settled solids can take place at the bottom of the tank. An outlet pipe adjacent to top of the tank and the surface of the fluid level in the septic tank allows the liquid to be decanted from the sediment in the septic tank and distributed into a leach field or alternatively discharged into streams and lakes.

The discharge of the treated liquid into leach fields or streams and lakes can be environmentally sound only if the septic tank system is functioning properly. However, often times in septic tanks the solids do not completely settle and may actually leave the septic system with the decanted liquor. This often causes plugging of drain fields where the liquor is pumped for leaching along with the pollution of leach field and/or streams or lakes in which the liquor is discharged.

As can be appreciated by the foregoing discussion, one of the difficulties in treating raw sewage is due to the significant amount of water in the sewage effluent. Applicant has found that if the feculent semi-solids are solids are removed immediately from the raw untreated influent and allowed to undergo aerobic bacterial digestion, the effectiveness of the subsequent digestion in a septic tank is improved to the degree that the liquor leaving the septic tank is pollution free and devoid of all suspended organic solids.

Due to the organic-free character of the liquor leaving the septic tank in the current invention neither pumps nor leach fields will be plugged when the decanted liquor passes through them. In addition the clear liquor is environmentally safe and of sufficient purity that even if percolation is inadequate to prevent the liquor from surfacing in the drain or leach field, no health hazard will occur.

Applicant is aware of a number of patents which relate to treating feculent wastes. These patents include U.S. Pat. No. 408,506 issued to McClellan, U.S. Pat. No. 1,539,255 issued to George, and U.S. Pat. No. 3,546,718 issued to Minnitte which is probably the most relevant of this group of patents. Also, applicant is aware of several British patents dealing with treatment of wastes, including British Pat. Nos. 22,276 and 25,844.

In reference to the invention, applicant has developed a sewage treatment system which is trouble free and does not require the normal maintenance commonly experienced with septic tank operation in rural areas.

Still another advantage of applicant's invention is that the liquor leaving the septic tank portion, being free of all organic matter, will leach at much lower percolation values than possible when using conventional septic tanks.

Also another advantage is that the decanted liquor leaving the septic tank portion of the current system is biologically inactive, pollution free and environmentally safe.

SUMMARY OF THE INVENTION

A self-contained sewage treatment system for treating feculent waste from dwellings and the like includes a waterless tank having a suspended sieve means for separating entrained semi-solids and solids from raw sewage influents, said tank having an inlet with the sieve means being suspended so the feculent solids entering through the inlet are matted the sieve where said solids are exposed to circulating air currents allowing them to undergo aerobic bacterial digestion, an outlet in the bottom of the said waterless tank for draining liquids therefrom to a watertight septic tank having its inlet connected through pipe means to said outlet of the waterless tank, with the septic tank having at least one settling chamber and means to decant clear liquor therefrom whereby the solid materials settling in the septic tank can undergo anaerobic digestion and allowing the liquor decanted from said septic tank free of all organic solids.

BRIEF DESCRIPTION OF THE DRAWINGS

The invention will be better understood by reference to the accompanying drawings wherein:

FIG. 1 is a cross-section through the novel system of the invention installed in the ground as would be typical for a rural dwelling not having access to commercial sewer lines;

FIG. 2 is a perspective of the sieve or basket shown in FIG. 1 which is utilized to separate the feculent organic solids and/or semi-solids from the sewage influent from a dwelling; and FIG. 3 is a schematic a typical installation of the novel system of the invention.

DESCRIPTION OF AN EMBODIMENT

As can be seen in FIG. 1 the system 1 consists of two basic tank structures, the first of which is a waterless tank 2 which has its outlet connected to a septic tank 23.

More particularly, the waterless tank 2 has a specific construction adapted for accomplishing the objectives of the invention. As shown in the drawing the waterless tank includes cylindrical walls 3 and preferably a sloped bottom 4 with an closing opening 5 at its top. The opening is covered by a weather cap 6 which seals the top of the tank from ingress of volunteer water. A vent 6A can be incorporated in the top of the tank which is shown in phantom in FIG. 1. This vent, however, is unnecessary since the preferred venting normally occurs through the soil pipe vent system of the dwelling due to the fact the flow to the waterless tank is very intermittent. Heated air and gasses from the biological activity within this waterless tank typically enters the soil pipe opening in the tank and is vented at the top of the dwelling through the conventional vent system. A counterflow of cold air through the same soil pipe vent system replaces this heated air. More importantly, it is to be recognized that this tank has a continuous circulation of air through its vent system due to the heating effect of the bio-mass establishing convection currents therein, no matter which venting arrangement is used.

Within the waterless tank 2 a sieve or basket 12 is suspended by brackets 11 positioned on wall 3 around the inner periphery of the tank. This sieve or basket is better shown in the perspective of FIG. 2 and includes a generally cylindrical vertical wall with an outwardly depending flange 13 at its top 15 and its bottom closed with an endplate 14. This sieve or basket contains a plurality of oblong perforations 16 in both the vertical wall and its bottom. It may, if desired, include larger apertures 17 (show in phantom) near the top thereof to enhance air circulation about the basket when it is installed in the waterless tank as shown in FIG. 1.

As is apparent in FIG. 1 the basket 12 is suspended in the waterless tank 2 by virtue of its flange 13 which rests on top of the brackets 11 so that the sieve or basket is suspended intermediately in the waterless tank as shown. It is to be noted, however, that while the sieve or basket 12 as shown as cone shaped, in other embodiments it will be totally cylindrical as opposed to being conical.

As best shown in FIG. 1, the waterless tank 2 is partially buried in the ground F and preferably includes two inlet pipes, the larger of which, soil pipe 8, carries the feculent influent or black water as it is sometimes called. The smaller pipe 9 is designed to carry the discharge from sinks, lavatories and the like which is often referred to as the gray water because it contains no feculent wastes.

More importantly, the end of soil pipe 8 is fashioned to form a weir 8A designed to distribute the deposits of the feculent wastes from water closets or toilets of the dwelling directly into the interior of the sieve or basket 12. The weir 8A as shown is a short trough (baffle) to slow the flow rate of the incoming raw sewage may be modified to reduce the flow rate so that feculent wastes from the toilets with the entrained feculent matter will not hydraulically wash the previously deposited feculent matter (bio-mass A) from the basket, as each new layer is matted therein.

If any of the feculent solids wash through the sieve, they are deposited on the sloping bottom 4 of the waterless tank, where they are washed to the outlet 10 of the tank 2 by the gray water entering through pipe 9 and immediately carried into the septic tank 23 through a check valve 20 via a connecting pipe 21. It is not necessary, however, that the gray water be used to wash the solids passing through the sieve or basket into the septic tank, since liquids draining from the digesting biomass will provide a similar washing action. In an alternate embodiment the gray water from the dwelling is bypassed directly to the septic tank without utilizing it to wash the bottom of the waterless tank free of solids. This latter arrangement is shown in the schematic of FIG. 3.

It is feasible though not desirable, to allow both the gray water and black water from the dwelling to enter the waterless tank 2 through the soil pipe 8. If this is done, an improved weir 8A is employed to reduce the "washing" action of the bio-mass A collected in the sieve or basket 12.

As can be appreciated this invention is designed to separate the majority of the solids in the black water entering the waterless tank by trapping them in the active bio-mass A in the sieve or basket 12. Further, this basket is suspended colder air entering the tank can circulate in the waterless tank through the perforation 16 and surround the basket 12 so that effective aerobic bacterial digestion can occur in the collected bio-mass A. The arrows C represents the circulation of cold air in FIG. 1. Of course as aerobic digestion occurs heat will be generated and warm air will rise from the bio-mass A which will cause convection currents to develop within the waterless tank thereby providing a constant circulation of air about the sieve or basket. This ensures that the necessary oxygen will be available efficient aerobic digestion. These natural convection currents mimic the aeration processes used to treat active sludges in sewage treatment plants but do so without the necessity of compressors or the like. As can be seen the air flow can pass through the larger apertures 17 (shown in phantom) if they are included in the basket, to the portion of the waterless tank below the supporting flange 13 of the basket or sieve 12.

With the arrangement shown in FIG. 1, it can be appreciated that no liquids are retained in the waterless tank 2, as any liquids and other materials flowing through the sieve or basket 12 will gravity feed to the septic tank 23 passing through the sieve or basket. These liquids enter the septic tank 23 via line 21 and through the inlet 29 where they pass directly into an internal chamber 25 of the septic tank. This chamber preferably includes at least two dividers 26 and 26a which separates this septic tank into two parts. The first part or chamber is the sediment chamber 27 wherein all the liquid and materials from the waterless tank 2 are collected. Here any entrained organic matter is allowed to settle to the bottom of the septic tank as sludge B. At the bottom of the septic tank the accumulated sludge undergoes anaerobic bacterial digestion. Divider 26 acts as a baffle and prevents floating materials from leaving this chamber.

After the sedimentation takes place in the septic tank 23 which further purifies the liquor D above the sludge B, this relatively clear liquor flows over the top of the divider or partition 26a into the storage or pump chamber 28 of the septic tank. This liquor E is clear and can be gravity fed directly to a leach field through outlet 30 and check valve 31. Obviously the check valve prevents any back flow of liquor and also prevents the ingress of any ground or volunteer waters into the septic system. Such extra water could overload it and/or reduce or destroy its digestive action. Similarly check valve 20 prevents any gasses or liquids from re-entering and flooding the waterless tank 2.

In some embodiments of the invention (see FIG. 3) the chamber 28 of the septic tank 23 will include a pump 42 to discharge the clear liquor E from the chamber when a water level sensing unit (not shown) senses the pump should lower the level in the chamber. Both the pump and the sensing unit are conventional and are not described here in detail, as they merely represent an option to the invention embodiment shown in FIG. 1.

In reference to the embodiment shown in FIG. 1, it can be appreciated that the septic tank 23 must be at a lower level that the waterless tank 2 if a gravity feed between the two tanks is used. Generally, a three-foot drop between the levels of these several tanks is required for effective operation of the invention unless a pump is utilized to scavenge the liquor from the bottom of the waterless tank and transfer it to the septic tank. Also, these tanks, which can be constructed of concrete or fiberglass, preferably have an outwardly depending flanges at their base to stabilize them and to prevent them from "floating" out of the grounds (see flanges 2A and 23A in FIG. 1).

To prevent water ingress into the septic tank 23, it is usually sealed with a cover 24 which typically includes a vent pipe 24A. This pipe vents this tank directly to the atmosphere so that various gasses produced during the decomposition of the organic matter can escape. In the drawing FIG. 1 this vent is shown as a separate vent but alternatively it could be connected via piping directly to the vent system of the dwelling through said pipe 8 if desired.

In the schematic of FIG. 3 the overall layout of the system is shown. In this schematic the alternate connection of the gray water line from the dwelling is shown as a separate line 40 going directly to the septic tank 23. If desired, both connections can be made and valves 41 utilized to control whether the gray water passes directly to the septic tank or is utilized to wash the bottom of the waterless tank 2 clean of organic matter as indicated by the broken line 9A.

The black water line 38 from the dwelling feeds directly to the inlet soil pipe 8 and the weir 8A so that the feculent matter is deposited directly into the sieve or basket 12 as previously described. In the schematic a pump 42 is shown which is located in the liquor chamber 28 of the septic tank 23. It is upstream of the check valve 31 and the plumbing system would typically include a valves 43 for controlling the flow of clear liquor to the leach fields 44 schematically indicated in FIG. 3. The dual drain fields were used in the tests but normally are not required in a typical installation.

The current invention has been tested and has proven very effective in areas where the percolation values were very low and/or the liquor from the septic tank had to be pumped a considerable distance to suitable leach field. It is believed that the invention represents a significant step forward in treatment procedures, when properly installed, because it can replace conventional sewage hook-ups to water carriage sewage systems due to its low maintenance and effective treatment system which is fully compatible with the environment.

From the above description of the system and the apparatus involved, it can be appreciated that the method involves the steps of separating a solid feculent matter from a sewage influent by collection it on a sieve device, providing air circulation about the collected solids for aerobic bacterial digestion, recovering the liquor from the influent in the area of the separated solids and flowing it into a separate septic tank for sedimentation and further anaerobic digestion, decanting the clear liquor from the septic tank and discharging it into the environment through a leach field and/or a body of water.

Having described my invention I claim:

1. A unitized raw sewage treatment system comprising:
    a first waterless tank means having suspended therein a perforated basket means, said tank means having an inlet operable to deposit effluents entering said waterless tank into said perforated basket means and drain means located at the bottom of said waterless tank operable to flow liquids to its outlet means;
    a septic tank means having an inlet, an outlet and at least one chamber therein operable to allow particular matter in effluents received in said septic said to settle to the bottom thereof; and
    pipe means connecting said outlet of said waterless tank means with said inlet of said septic means whereby solid and semi-solid particulate wastes in raw sewage effluents entering said waterless tank means will be trapped in said basket means where said wastes will undergo aerobic digestion and liquid effluents egressing from said waterless tank will enter said septic tank means where particulate wastes will therein undergo anaerobic digestion after when settling to the bottom of said septic tank means.

2. The unitized raw sewage treatment system defined in claim 1 wherein the pipe means includes a one-way check valve operable to prevent reverse flow from the septic tank means to the waterless tank means through said pipe means connecting said tanks.

3. The unitized raw sewage treatment system defined in claim 1 wherein the outlet of the septic tank means is connected to a leach field means operable to percolate the effluents leaving the septic tank means into the soil into which the leach field means has been buried.

4. The unitized raw sewage means defined in claim 1 wherein the septic tank means is sealed and includes at least two chambers therein.

5. The unitized raw sewage treatment system defined in claim 1 wherein the inlet means of the waterless tank means includes a weir means operable to distribute the effluents containing particulate wastes entering said waterless tank through said inlet means into said basket means with a minimum of hydraulic displacement of particulate wastes collected in said basket means.

6. The unitized raw sewage treatment means defined in claim 1 wherein the waterless tank means has two inlets, a first inlet operable to deposit raw sewage effluents containing feculent wastes into the basket means and a second inlet operable to flush the bottom of said waterless tank with raw sewage effluents not containing feculent wastes into its outlet and into the pipe means connected to the septic tank means.

7. The unitized raw sewage treatment system defined in claim 1 wherein the drain means includes a sloping bottom the waterless tank means operable to cause all fluids therein to gravity drain to the outlet of said waterless tank means.

8. The unitized raw sewage treatment system defined in claim 1 wherein the waterless tank means is sealed and air circulation therein is provided through the inlet means of said waterless tank by providing communication to the atmosphere.

9. The unitized raw sewage treatment system defined in claim 1 wherein the septic tank means is sealed and contains a separate vent means communicating with the atmosphere.

10. The unitized raw sewage treatment system defined in claim 1 wherein the waterless tank means is located above the level of the septic tank means so liquid effluents draining from the bottom of said waterless tank and egressing through its outlet will gravity drain into the septic tank via the pipe means.

11. The unitized raw sewage treatment means defined in claim 1 wherein the waterless tank means is constructed of fiberglass and includes an outwardly depending flange at its bottom operable to prevent said waterless tank from floating out of the ground when said waterless tank means is buried in the ground when in service.

12. The unitized raw sewage treatment system defined in claim 1 wherein the outlet of said septic tank means includes a pump means operable to force flow liquid leaving said septic tank means into a leach field means when the latter is connected thereto.

13. A method of treating raw sewage effluents containing solid and semi-solid wastes comprising the steps of:
flowing said effluents into a perforated basket means operable to separate the wastes from the liquids in the effluent;
providing air circulation about said perforated basket means to cause said wastes to undergo aerobic digestion;
collecting all liquids and small particles of the wastes beneath said basket means, including liquids released by the aerobic digestion action;
placing all the resulting collected matter in a septic system having a settling chamber where organic material in such matter will undergo further anaerobic digestion; and
disposing of the resulting liquids from the septic system in a leach field or the like.

* * * * *